Nov. 15, 1960 V. C. MOORE 2,959,985
TRANSMISSION
Filed Nov. 25, 1957
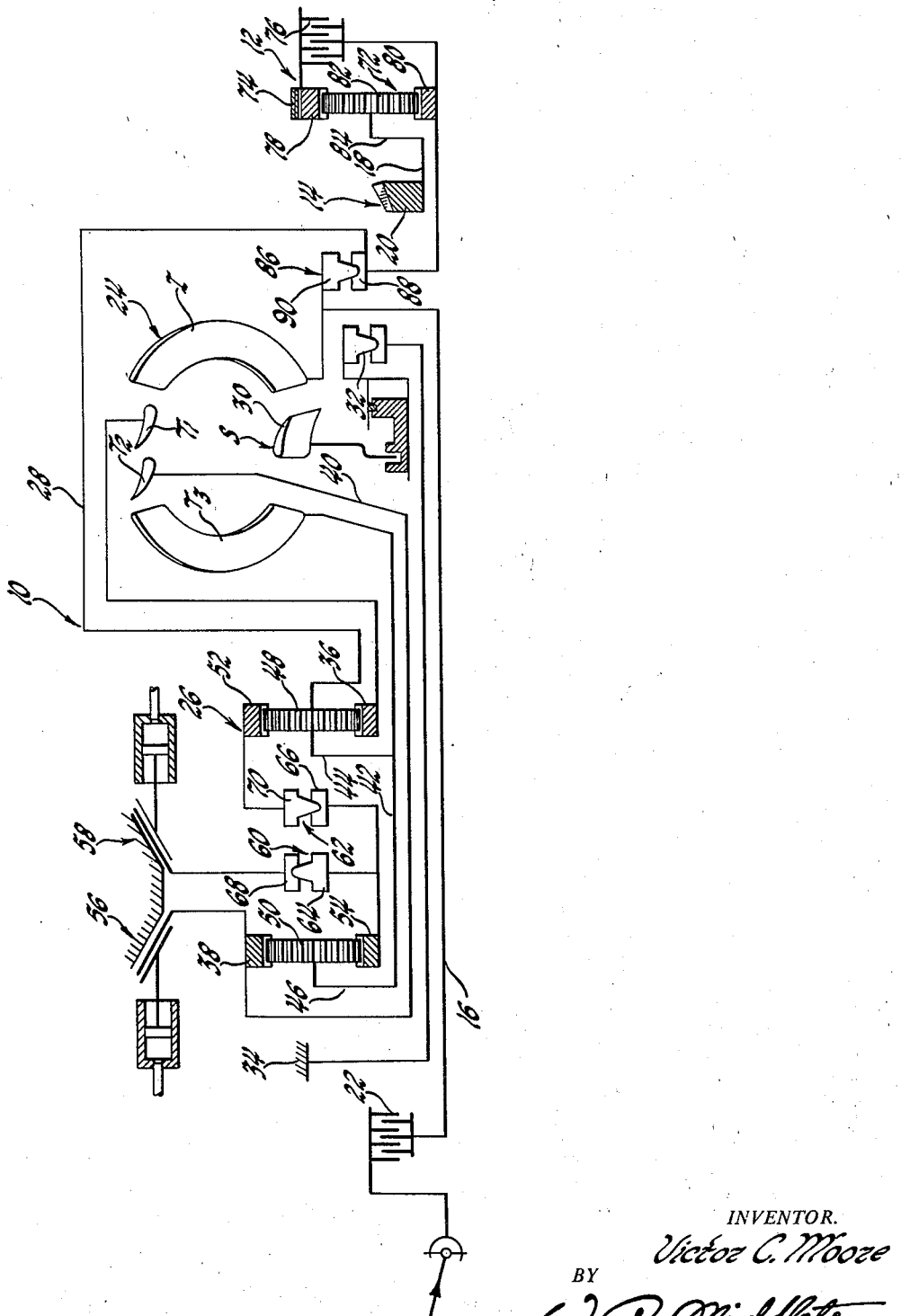
INVENTOR.
Victor C. Moore
BY
W. C. Middleton
ATTORNEY United States Patent Office 2,959,985
Patented Nov. 15, 1960

2,959,985
TRANSMISSION
Victor C. Moore, Plymouth, Mich., assignor to General Motors Corporation, Detroit, Mich., a corporation of Delaware Filed Nov. 25, 1957, Ser. No. 698,597
16 Claims. (Cl. 74—740)

This invention relates to improvements in variable speed drives of the automatic type adapted, although not exclusively, for installation in motor vehicles.

In motor vehicles, it is always desirable to have the engine available as a brake for coast conditions. When the wheels are driving, the engine can offer considerable resistance if the drive connection therebetween is maintained. With the advent of automatic transmissions of the character utilizing hydrodynamic torque transmitting and/or multiplying devices, e.g., fluid couplings and torque converters, much of the engine resistance has been lost. The primary reason for this is because couplings and converters are designed for efficient operation whenever the engine is driving. Inherently then these couplings and converters are inefficient to transfer drive in an opposite direction, i.e. to the engine. As a result, couplings and converters so designed do not perform well as brakes.

With this problem in mind, the invention contemplates a variable speed drive provided with an auxiliary power path for by-passing the main transmission and directly connecting the power and load shafts for more effective engine braking. Specifically, the invention provides a variable speed drive comprising main and auxiliary transmissions arranged in series between power and load shafts in a novel manner. Hence, when the power shaft drives, additional speed ratios are afforded and when the load shaft drives, the main transmission will be by-passed and the auxiliary transmission will overdrive the power shaft through a mechanical connection.

Because of the demand for both lower vehicle body floor lines and the increased power, the space for positioning the transmission closely adjacent to the engine has become inadequate. With the transmission larger to transfer the increased power and the floor line lower, it is necessary to form the floor line around the transmission, resulting in an objectionable hump in the floor line.

Accordingly, the invention provides a transmission which may be mounted in the rear of the vehicle next to the rear axle. The transmission has been divided into two units so as to afford additional speed ratios as well as effective engine braking.

In carrying out the invention, a variable speed drive is provided which comprises a main transmission and an auxiliary transmission arranged in series between power and load shafts. The auxiliary transmission includes a planetary gear set controlled by a brake and clutch so that, when combined with the main transmission, the overall speed ratio coverage is supplemented. This is an advantage since an emergency low is obtainable when the auxiliary transmission is conditioned for a reduced speed ratio. The underdrive ratio, when combined with that afforded by the main transmission will furnish a lower overall speed ratio between the power and load shafts, assuming the power shaft is driving.

Through a one-way device, the auxiliary transmission is arranged to be connected mechanically to the power shaft whenever the load shaft is driving so that engine braking is always available with the main transmission being by-passed. Also, the auxiliary transmission, when prepared for an underdrive, will tend to overdrive the power shaft, assuming the load shaft is driving, thus augmenting engine braking.

The foregoing and other objects and advantages of the invention will be apparent from the following description and from the drawing which shows schematically a transmission demonstrating the principles of the invention.

Referring to the drawing, numerals 10 and 12 designate, respectively, a main transmission and an auxiliary transmission arranged in series to drive conventional differential gearing 14 for a vehicle. A power shaft 16 is driven by a prime mover, such as a vehicle engine (not shown), from which drive is transferred through the main and auxiliary transmissions 10 and 12 to a load shaft 18. The load shaft 18 drives the usual input bevel gear 20 for the differential gearing 14 which, in turn, revolves the vehicle wheels (not shown). A neutral clutch 22 is interposed between the engine and the power shaft 16 to furnish a true neutral condition for the transmission, when disengaged, insuring against any tendency for the vehicle to be moved by the inertia of intermediate parts.

Pressure fluid for operating the brakes and clutches utilized herein and for supplying the torque converter 24 may be derived from a suitable source, e.g., pumps driven by the power and load shafts 16 and 18. This pressure fluid may be supplied in the proper sequence by any suitable control system of a character understood by those versed in the art.

Most of the ratio coverage is contributed by the main transmission 10 through the cooperation of a hydrodynamic torque transmitting device, such as a torque converter 24, and the planetary gearing 26 which together transfer drive through a crossover member 28 to the auxiliary transmission 12. The gearing 26 together with the torque converter 24 offers an infinite number of ratios, as will be hereinafter explained.

Drive to the torque converter 24, assuming neutral clutch 22 is engaged, is from the power shaft 16 which will rotate a bladed impeller I for the converter. Coacting with the impeller I are a plurality of turbines, namely, a first turbine $T_1$, a second turbine $T_2$, and a third turbine $T_3$, each of which is furnished with an appropriate blade structure. A stator S is also included and has movable blades, represented diagrammatically as a single blade 30, which are preferably infinitely variable between predetermined limits to change the torque multiplying characteristics of the converter 24. The repositioning of blade 30 may be accomplished in any suitable way, e.g., as disclosed in the Kelley application S.N. 671,190, filed July 11, 1957. The stator S is prevented from reverse rotation by a one-way device 32 grounded at 34. Fluid is pumped outwardly by the impeller I and flows successively through $T_1$, $T_2$, $T_3$ and S in a counterclockwise direction around a closed toroidal path in a known manner.

One-way device 32 as well as others, hereinafter referred to, may be of the usual structure arranged to prevent relative motion between two members in one direction while permitting free relative rotation in an opposite direction. These devices may utilize one-way elements such as sprags, rollers, or the like, for the locking and unlocking action.

The gearing 26 has a front input sun gear 36 connected to turbine $T_1$ and a rear input ring gear 38 joined by an interconnecting element 40 extending through the converter 24 to turbine $T_2$. Turbine $T_3$ is connected by a shaft 42 to both the front and rear planet carriers 44 and 46 which, respectively, support a plurality of front planet pinions 48 meshing with front sun gear 36 and a plurality of rear planet pinions 50 meshing with the rear ring gear 38. The front carrier 44 is, in turn, drive connected to the crossover member 28. A front reaction ring gear 52 meshing with front planet pinions 48 completes the front planetary gear unit and a rear reaction sun gear 54 meshing with the rear planet pinions 50 completes the rear planetary gear unit.

A reverse brake 56 is arranged to hold the rear input ring gear 38 to provide a reverse drive, as will be explained in the operational summary. Forward drive is obtained by engaging a forward brake 58 which through one-way devices 60 and 62 will prevent reverse rotation of the front reaction ring gear 52 and the rear reaction sun gear 54. As shown, the inner races 64 and 66 of the devices 60 and 62 are interconnected while the outer race 68 for device 60 extends to the brake 58 and the outer race 70 of device 62 is secured to the front reaction ring gear 52. Assuming the forward brake 58 is engaged, the one-way device 60 will prevent reverse rotation of the rear reaction sun gear 64 and accordingly hold the inner race 66 of device 62 so that the front reaction ring gear 52 cannot revolve backwards. One-way device 62 will permit the front reaction ring gear 52 to rotate freely forwardly but will not allow the rear reaction sun gear 54 to revolve faster than the ring gear 52.

The auxiliary transmission 12 has a planetary gear set 72 which is controlled by a brake 74 and a clutch 76 so as to afford two different speed ratios. The gear set 72 includes a reaction ring gear 78 and an input sun gear 80 connected to the crossover member 28, both of which gears 78 and 80 intermesh with a series of planet pinions 82 journaled on an output planet carrier 84. The output planet carrier 84 is, in turn, drive connected to the load shaft 18. Clutch 76, when engaged, will clutch together the gears 78 and 80 and lock up the gear set 72 so that a direct drive is provided between the crossover member 28 and the load shaft 18. The auxiliary transmission 12 in direct drive does not affect the drive being provided by the main transmission 10 and functions in the manner of a clutch for transferring drive from the main transmission 10 to the load shaft 18. When the clutch 76 is disengaged and the band 74 operated to hold the reaction ring gear 78 stationary, then, assuming drive is being transferred from the main transmission 10 by the crossover member 28 to the auxiliary transmission input sun gear 80, the planet carrier 84 will be revolved at a reduced speed determined by the ratio of the gear set 72. This ratio will supplement the ratio coverage from the main transmission 10 so that the overall ratio will be the product of the two ratios. Consequently, an emergency low speed ratio can be obtained for extreme road load conditions. To explain this aspect further, assume that the main transmission 10 provides a low speed ratio of 4:1 while the auxiliary transmission 12 has a 2:1 ratio. When these transmissions are combined then the overall ratio becomes 8:1 which means that the power shaft 16 will revolve eight times as the load shaft 18 revolves once.

The foregoing described operation of the auxiliary transmission 12 assumes that the power shaft 16 is driving. However, the operation of the transmission 12 is different when the load shaft 18 is driving. If the brake 74 is engaged, then because the planet carrier 84 is driving, the sun gear 80 will be overdriven or overspeed in a forward direction relative to the planet carrier 84. To take advantage of this aspect, a one-way device 86 is interposed between the power shaft 16 and the input sun gear 80, the inner race 88 thereof being revolvable both with the crossover member 28 and the sun gear 80 while the outer race 90 is connected to the power shaft 16. Therefore, with the sun gear 80 being overdriven, the one-way device 86 will lock so that a direct mechanical connection is made with the power shaft 16 hence by-passing the main transmission 10 and desirably tending to overdrive the engine for maximum engine braking. When the clutch 76 is engaged and the brake 74 disengaged the one-way device 86 will still be effective to transfer drive between the load shaft 18 and the power shaft 16, again by-passing the main transmission 10 for engine braking. This by-pass aspect is particularly desirable when a torque converter, such as that shown, is interposed in the drive train. By design the torque converter 24 is intended to be most efficient for forward driving. When the drive is reversed, the converter 24 becomes inefficient and hence would be of little assistance for engine braking.

The operation of the variable speed drive is described as designated under the appropriate headings.

*Neutral*

In Neutral, the neutral clutch 22 is disengaged and therefore no drive can be transferred by the engine to the power shaft 16. The main and auxiliary transmissions 10 and 12 will be ineffective regardless of their particular status at the time the neutral clutch 22 is disengaged.

*Forward drive*

Assuming the engine is operating and that the vehicle is at rest, to establish forward drive, the forward brake 58 and the neutral clutch 22 are engaged while the reverse brake 56 is released. As the engine speeds up, fluid pumped by the impeller I will transfer a positive torque to turbine $T_1$ and cause the front input sun gear 36 to be rotated forwardly. At this time both the front and rear carriers 44 and 46, and hence turbine $T_3$, are prevented from rotation due to the inertia from the stationary vehicle. Therefore, forward rotation of the front sun gear 36 will tend to revolve the front reaction ring gear 52 backwards and, of course, as described, the one-way devices 60 and 62 prevent this. As a result, the front carrier 44 is revolved forwardly at a reduced speed and carries therewith, due to the imposition of a positive torque thereon, both turbine $T_3$ and the rear carrier 46. A torque, which is the product of the front planetary gear unit ratio and $T_1$ torque, is then transferred through the crossover member 28, and the auxiliary transmission 12, which for forward drive has the clutch 76 engaged, to the load shaft 18. As the speed of the impeller I increases, a positive torque will be imposed on turbine $T_2$ which through the interconnecting element 40 will cause the rear input ring gear 38 to be revolved forwardly. The resultant tendency of the rear reaction sun gear 54 to revolve backwards is prevented by the one-way device 60 whereupon the rear planet carrier 46 is driven at a reduced speed relative to the rear ring gear 38 and adds the torque of turbine $T_2$ multiplied by the ratio of the rear planetary gear unit to the overall ratio now being provided. A further increase of speed of the impeller I will at some fixed relationship between input and output speeds cause torque to be impressed on the turbine $T_3$, which will contribute drive as soon as $T_3$ speed tends to exceed $T_1$ and $T_2$ speeds.

As the speed of the vehicle continues to progressively increase, the torque supplied by turbine $T_1$ decreases until $T_1$ reaches its terminal speed at which time turbine $T_1$ does not add torque and the second turbine $T_2$ will cause the carriers 44 and 46 to be revolved faster than turbine $T_1$ can drive them. Consequently, the front reaction ring gear 52 will start to revolve forwardly and $T_1$ will idle in the fluid stream. Again, upon further increase in speed, turbine $T_2$ will reach its terminal speed and can no longer drive the carriers as fast as turbine $T_3$ which has a direct connection to each of the carriers. Therefore, the rear reaction sun gear 54 is driven forwardly when the one-way device 60 releases and the second turbine $T_2$ now idles in the fluid stream.

*Reverse drive*

For Reverse, the forward brake 58 is disengaged and the reverse brake 56 is engaged as is the neutral clutch 22. With the reverse brake 56 engaged, the rear input ring gear 38 and accordingly turbine $T_2$ are prevented from rotation in either direction. Turbine $T_1$ being the initial driver will revolve the front input sun gear 36 forwardly which, because the carrier 44 is initially held by the inertia of the vehicle, will cause the ring gear 52 to be driven backwards and through the one-way device 62 will attempt to revolve the rear sun gear 54 backwards. This is permitted since the forward brake 58 is inoperative and hence the one-way device 60 is ineffective. Rotation of the rear sun gear 54 backwards will cause the planet carrier 46 to be revolved at a reduced speed in the same direction and through crossover member 28, auxiliary transmission 12 and differential gearing 14 drive the vehicle in reverse. This backwards rotation, of course, will positively drive turbine $T_3$ backwards which can be designed to contribute hydraulically to the reverse motion.

Low range

As so far explained, the auxiliary transmission 12 has not affected the drive since the clutch 76 therefor has been maintained engaged. In Low Range the clutch 76 is disengaged and the brake 74 engaged. This, as described before, with the power shaft 16 driving, will afford an emergency low due to the series connection between the two transmissions. When the load shaft 16 drives, then the overdriving action thereof will be transferred directly to the power shaft 16 by the one-way device 86. Therefore, Low Range is utilized both for braking and for an emergency low, if required, for instance, by excessive road load conditions.

From the foregoing it can be seen that two transmissions are arranged in series and advantageously positioned next to the vehicle differential so as to not interfere with the floor line of the vehicle in the vicinity of the passenger compartment. Also, by the auxiliary transmission 12, the main transmission 10 can be by-passed for more effective engine braking and in addition, an emergency low ratio can be obtained.

The invention is to be limited only by the following claims.

I claim:

1. In a variable speed drive, the combination of a power shaft, a load shaft, a main transmission drive connected to the power shaft and adapted to provide a plurality of speed ratios, an auxiliary transmission arranged in series with the main transmissoin to drive connect the main transmission to the load shaft, the auxiliary transmission including a planetary gear set having an input element rotatable by the main transmission when the power shaft is driving, an output element rotatable with the load shaft and a reaction element, ratio changing means selectively operable including a brake for holding the reaction element stationary to provide one speed ratio through the gearing and a clutch for clutching together two elements of the gear set to provide a direct drive speed ratio therethrough, the gear set being combined with the main transmission by operation of the ratio changing means to drive the load shaft at the speed ratio established by the main transmission when the clutch is engaged and also to provide additional speed ratios when the reaction element is held by the brake with the power shaft driving in each instance, and means rendered operative when the load shaft is driving so as to cause the input element of the auxiliary transmission to be drivingly connected to the power shaft and so as to by-pass the main transmission.

2. In a variable speed drive, the combination of a power shaft, a load shaft, a main transmission drive connected to the power shaft and adapted to provide a plurality of forward speed ratios and a reverse drive, an auxiliary transmission arranged in series with the main transmission to drive connect the main transmission to the load shaft, the auxiliary transmission comprising a planetary gear set having an input gear rotatable by the main transmission, a reaction gear, and an output planet carrier rotatable with the load shaft, the planet carrier having journaled thereon a plurality of planet pinions intermeshing with the input and reaction gears, ratio changing means selectively operable for holding the reaction gear stationary to provide one drive ratio through the gear set and for clutching together the input and reaction gears to provide another drive ratio therethrough, the auxiliary transmission and the main transmission cooperating so that by operation of the ratio changing means the gear set will provide additional speed ratios when the power shaft is driving, and means rendered operative when the load shaft is driving for drivingly connecting the input gear of the auxiliary transmission to the power shaft and by-passing the main transmission.

3. In a variable speed drive, the combination of a power shaft, a load shaft, a main transmission drive connected to the power shaft and adapted to provide a plurality of forward speed ratios and a reverse drive, an auxiliary transmission arranged in series with the main transmission to drive connect the main transmission to the load shaft, the auxiliary transmission comprising a planetary gear set having an input sun gear rotatable by the main transmission, a reaction ring gear, and an output planet carrier rotatable with the load shaft, the planet carrier having journaled thereon a plurality of planet pinions intermeshing with the input sun and reaction ring gears, ratio changing means selectively operable for holding the reaction ring gear stationary to provide one drive ratio through the gear set and for clutching together the input sun and reaction ring gears to provide another drive ratio therethrough, the auxiliary transmission and the main transmission cooperating so that by operation of the ratio changing means the gear set will provide additional speed ratios when the power shaft is driving, and means rendered operative when the load shaft is driving for drivingly connecting the input sun gear of the auxiliary transmission to the power shaft and by-passing the main transmission.

4. In a variable speed drive, the combination of a power shaft revolvable by an engine, a load shaft, a main transmission drive connected to the power shaft and adapted to provide a plurality of forward speed ratios and a reverse drive, an auxiliary transmission arranged in series with the main transmission to drive connect the main transmission to the load shaft, the auxiliary transmission comprising a planetary gear set having an input gear rotatable by the main transmission, a reaction gear and an output planet carrier rotatable with the load shaft, the planet carrier having journaled thereon a plurality of planet pinions intermeshing with the input and reaction gears, ratio changing means selectively operable for holding the reaction gear stationary to provide one drive ratio through the gear set and for clutching together the input and reaction gears to provide another drive ratio therethrough, the auxiliary transmission and the main transmission cooperating so that by operation of the ratio changing means the gear set will provide additional speed ratios when the power shaft is driving, and means rendered operative when the load shaft is driving and the reaction gear is stationary for drivingly connecting the input gear of the auxiliary transmission to the power shaft so that the power shaft is overdriven relative to the load shaft to increase engine braking.

5. In a variable speed drive, the combination of a power shaft, a load shaft, a main transmission drive connected to the power shaft and adapted to provide a plurality of forward speed ratios and a reverse drive, an auxiliary transmission arranged in series with the main transmission, the auxiliary transmission comprising a planetary gear set having an input gear rotatable by the main transmission, a reaction gear, and an output planet carrier rotatable with the load shaft, the planet carrier having journaled thereon a plurality of planet pinions intermeshing with the input and reaction gears, brake means for preventing rotation of the reaction gear to provide one drive ratio through the gear set, clutch means for joining together the reaction gear and the input gear to provide another drive ratio through the gear set, the auxiliary transmission cooperating with the main transmission by the operation of the brake and clutch means to provide combined speed ratios determined by both transmissions when the power shaft is driving, and overrunning means for drivingly connecting the auxiliary transmission input gear to the power shaft when the load shaft is driving so as to by-pass the main transmission.

6. In a variable speed drive, the combination of a power shaft, a load shaft, a main transmission drive connected to the power shaft and adapted to provide a plurality of forward speed ratios and a reverse drive, an auxiliary transmission arranged in series with the main transmission, the auxiliary transmission comprising a planetary gear set having an input sun gear rotatable by the main transmission, a reaction ring gear, and an output planet carrier rotatable with the load shaft, the planet carrier having journaled thereon a plurality of planet pinions intermeshing with the input sun and reaction ring gears, brake means for preventing rotation of the reaction ring gear to provide one drive ratio through the gear set, clutch means for joining together the reaction ring gear and the input sun gear to provide another drive ratio through the gear set, the auxiliary transmission cooperating with the main transmission by the operation of the brake and clutch means to provide combined speed ratios determined by both transmissions when the power shaft is driving, and overrunning means for drivingly connecting the auxiliary transmission input gear to the power shaft when the load shaft is driving so as to by-pass the main transmission.

7. In a variable speed drive, the combination of a power shaft, a load shaft, a main transmission drive connected to the power shaft and adapted to provide a plurality of forward speed ratios and a reverse drive, an auxiliary transmission arranged in series with the main transmission, the auxiliary transmission comprising a planetary gear set having an input gear rotatable by the main transmission, a reaction gear, and an output planet carrier rotatable with the load shaft, the planet carrier having journaled thereon a plurality of planet pinions intermeshing with the input and reaction gears, a brake operative for preventing rotation of the reaction gear to provide one drive ratio through the gear set, a clutch operative for joining together the reaction gear and the input gear to provide another drive ratio through the gear set, the auxiliary transmission cooperating with the main transmission by the selective operation of the brake and clutch to provide combined speed ratios determined by both transmissions when the power shaft is driving, and a one-way clutch for drivingly connecting the auxiliary transmission input gear to the power shaft when the load shaft is driving so as to by-pass the main transmission and cause the power shaft to be overdriven relative to the load shaft with the brake operative.

8. In a variable speed drive, the combination of a power shaft, a load shaft, a main transmission drive connected to the power shaft and adapted to provide a plurality of forward speed ratios and a reverse drive, an auxiliary transmission arranged in series with the main transmission, the auxiliary transmission comprising a planetary gear set having an input sun gear rotatable by the main transmission, a reaction ring gear, and an output planet carrier rotatable with the load shaft, the planet carrier having journaled thereon a plurality of planet pinions intermeshing with the input sun and reaction ring gears, a brake operative for preventing rotation of the reaction ring gear to provide one drive ratio through the gear set, a clutch operative for joining together the reaction ring gear and the input sun gear to provide another drive ratio through the gear set, the auxiliary transmission cooperating with the main transmission by the selective operation of the brake and clutch to provide combined speed ratios determined by both transmissions when the power shaft is driving, and a one-way clutch for drivingly connecting the auxiliary transmission input gear to the power shaft when the load shaft is driving so as to by-pass the main transmission and cause the power shaft to be overdriven relative to the load shaft with the brake operative.

9. In a variable speed drive for an engine driven vehicle, the combination of a power shaft, a load shaft, a main transmission drive connected to the power shaft and adapted to provide a plurality of forward speed ratios and a reverse drive, an auxiliary transmission arranged in series with the main transmission to drive connect the main transmission to the load shaft, the auxiliary transmission comprising a planetary gear set having an input gear rotatable by the main transmission, a reaction gear and an output planet carrier rotatable with the load shaft, the planet carrier having journaled thereon a plurality of planet pinions intermeshing with the input and reaction gears, ratio changing means selectively operable for holding the reaction gear stationary to provide one drive ratio through the gear set and for clutching together the input and reaction gears to provide another drive ratio therethrough, the auxiliary transmission and the main transmission cooperating so that by operation of the ratio changing means the gear set will provide additional speed ratios when the power shaft is driving, means for drivingly connecting the input gear of the auxiliary transmission to the power shaft when the load shaft is driving so as to by-pass the main transmission, and a clutch interposed between the engine and the power shaft for interrupting drive therebetween.

10. In a variable speed drive for a vehicle having mounted in the front, an engine, and in the rear, differential gearing, the combination of a power shaft rotatable by the engine, a load shaft rotatable with the differential gearing, a main transmission adapted to provide a plurality of forward speed ratios and a reverse drive, the main transmission being drive connected to the power shaft and disposed in the rear of the vehicle closely adjacent to the differential gearing, an auxiliary transmission disposed in the rear of the vehicle closely adjacent to the differential gearing and arranged in series with the main transmission to drive connect the main transmission to the load shaft, the auxiliary transmission comprising gearing and ratio changing means selectively operable to control the gearing; the gearing being combined with the main transmission by operation of the ratio changing means to drive the load shaft at the ratios established by the main transmission and also to provide additional speed ratios both when the power shaft is driven by the engine, and means rendered operative when the load shaft is driven by the differential gearing for connecting the auxiliary transmission to the power shaft so as to by-pass the main transmission and so as to obtain direct engine braking.

11. In a variable speed drive for a vehicle having mounted in the front, an engine and in the rear, differential gearing, the combination of a power shaft rotatable by the engine, a load shaft rotatable with the differential gearing, a main transmission adapted to provide a plurality of forward speed ratios and a reverse drive, the main transmission being drive connected to the power shaft and disposed in the rear of the vehicle closely adjacent to the differential gearing, an auxiliary transmission disposed in the rear of the vehicle closely adjacent to the differential gearing and arranged in series with the main transmission to drive connect the main transmission to the load shaft, the auxiliary transmission comprising a planetary gear set having an input gear rotatable by the main transmission, a reaction gear and an output planet carrier rotatable with the load shaft, the planet carrier having journaled thereon a plurality of planet pinions intermeshing with the input and reaction gears, ratio changing means selectively operable for holding the reaction gear stationary to provide one drive ratio through the gear set and for clutching together the input and reaction gears to provide a direct drive ratio therethrough, the auxiliary transmission and the main transmission cooperating so that by operation of the ratio changing means the gear set will provide additional speed ratios when the power shaft is driven by the engine, and means rendered operative when the load shaft is driven by the differential gearing for drivingly connecting the input gear of the auxiliary transmission to the power shaft so as to by-pass the main transmission and so as to increase engine braking.

12. In a variable speed drive for a vehicle having mounted in the front, an engine and in the rear, differential gearing, the combination of a power shaft rotatable by the engine, a load shaft rotatable with the differential gearing, a main transmission adapted to provide a plurality of forward speed ratios and a reverse drive, the main transmission being drive connected to the power shaft and disposed in the rear of the vehicle closely adjacent to the differential gearing, an auxiliary transmission disposed in the rear of the vehicle closely adjacent to the differential gearing and arranged in series with the main transmission to drive connect the main transmission to the load shaft, the auxiliary transmission comprising a planetary gear set having an input gear rotatable by the main transmission, a reaction gear and an output planet carrier rotatable with the load shaft, the planet carrier having journaled thereon a plurality of planet pinions intermeshing with the input and reaction gears, ratio changing means selectively operable for holding the reaction gear stationary to provide one drive ratio through the gear set and for clutching together the input and reaction gears to provide a direct drive ratio therethrough, the auxiliary transmission and the main transmission cooperating so that by operation of the ratio changing means the gear set will provide additional speed ratios when the power shaft is driven by the engine, means rendered operative when the load shaft is driven by the differential gearing for drivingly connecting the input gear of the auxiliary transmission to the power shaft so as to by-pass the main transmission and so as to increase engine braking, and a clutch interposed between the engine and the power shaft for interrupting drive therebetween.

13. In a variable speed drive for a vehicle having mounted in the front, an engine, and in the rear, differential gearing, the combination of a power shaft rotatable by the engine, a load shaft rotatable with the differential gearing, a main transmission adapted to provide a plurality of forward speed ratios and a reverse drive, the main transmission being drive connected to the power shaft and disposed in the rear of the vehicle on one side of the differential gearing closely adjacent thereto, an auxiliary transmission disposed in the rear of the vehicle on the opposite side of the differential gearing closely adjacent thereto and arranged in series with the main transmission, the auxiliary transmission comprising a planetary gear set having an input gear rotatable by the main transmission, a reaction gear, and an output planet carrier rotatable with the load shaft, the planet carrier having journaled thereon a plurality of planet pinions intermeshing with the input and reaction gears, brake means for preventing rotation of the reaction gear to provide one drive ratio through the gear set, clutch means for joining together the reaction gear and the input gear to provide another drive ratio through the gear set, the auxiliary transmission cooperating with the main transmission by the selective operation of the brake and clutch means to provide combined speed ratios determined by both transmissions when the power shaft is driven by the engine, and overrunning means for directly connecting the auxiliary transmission input gear to the power shaft when the load shaft is driven by the differential gearing so as to by-pass the main transmission.

14. In a variable speed drive for a vehicle having mounted in the front, an engine, and in the rear, differential gearing, the combination of a power shaft rotatable by the engine, a load shaft rotatable with the differential gearing, a main transmission adapted to provide a plurality of forward speed ratios and a reverse drive, the main transmission being drive connected to the power shaft and disposed in the rear of the vehicle on one side of the differential gearing closely adjacent thereto, an auxiliary transmission disposed in the rear of the vehicle on the opposite side of the differential gearing closely adjacent thereto and arranged in series with the main transmission, the auxiliary transmission comprising a planetary gear set having an input gear rotatable by the main transmission, a reaction gear, and an output planet carrier rotatable with the load shaft, the planet carrier having journaled thereon a plurality of planet pinions intermeshing with the input and reaction gears, brake means for preventing rotation of the reaction gear to provide one drive ratio through the gear set, clutch means for joining together the reaction gear and the input gear to provide another drive ratio through the gear set, the auxiliary transmission cooperating with the main transmission by the selective operation of the brake and clutch means to provide combined speed ratios determined by both transmissions when the power shaft is driven by the engine, overrunning means for directly connecting the auxiliary transmission input gear to the power shaft when the load shaft is driven by the differential gearing so as to by-pass the main transmission, and a clutch interposed between the engine and the power shaft for interrupting drive therebetween.

15. In a variable speed drive for a vehicle having mounted in the front, an engine, and in the rear, differential gearing drive connected to the rear vehicle wheels, the combination of a power shaft rotatable by the engine, a main transmission arranged to transfer drive from the power shaft to the differential gearing at a plurality of speed ratios, the main transmission disposed in the rear of the vehicle closely adjacent to one side of the differential gearing, an auxiliary transmission disposed in the rear of the vehicle closely adjacent to the opposite side of the differential gearing and arranged in series with the main transmission to drive connect the main transmission to the vehicle wheels, the auxiliary transmission comprising gearing and ratio changing means selectively operable to control the gearing; the gearing being combined with the main transmission by operation of the ratio changing means to provide additional speed ratios when the power shaft is driven by the engine, and means for connecting the auxiliary transmission to the power shaft so as to by-pass the main transmission when the vehicle wheels are driving the differential gearing.

16. In a variable speed drive for a vehicle having mounted in the front, an engine, and in the rear, differential gearing drive connected to the rear vehicle wheels, the combination of a power shaft rotatable by the engine, a main transmission arranged to transfer drive from the power shaft to the differential gearing at a plurality of speed ratios, the main transmission being disposed in the rear of the vehicle closely adjacent to one side of the differential gearing, and an auxiliary transmission disposed in the rear of the vehicle closely adjacent to the opposite side of the differential gearing and adapted to transfer drive from the main transmission to the differential gearing at additional speed ratios when the power shaft is driving and to by-pass the main transmission and drivingly connect the differential gearing to the power shaft when the differential gearing is driving.

References Cited in the file of this patent

UNITED STATES PATENTS

| | | |
|---|---|---|
| 2,027,013 | Barnes | Jan. 7, 1936 |
| 2,259,732 | Burtnett | Oct. 21, 1941 |
| 2,397,634 | Voytech | Apr. 2, 1946 |
| 2,414,359 | Carnagua et al. | Jan. 14, 1947 |
| 2,583,556 | Fleischel | Jan. 29, 1952 |
| 2,682,786 | Flinn | July 6, 1954 |
| 2,687,657 | Kugel et al. | Aug. 31, 1954 |
| 2,693,120 | Maybach | Nov. 2, 1954 |
| 2,783,661 | Dryer | Mar. 5, 1957 |